United States Patent [19]

Burrill

[11] Patent Number: 4,806,266

[45] Date of Patent: Feb. 21, 1989

[54] DETERGENT FOAM CONTROL AGENTS CONTAINING A SILICONE ANTIFOAM AND A FATTY ALCOHOL

[75] Inventor: Peter M. Burrill, S. Glamorgan, Wales

[73] Assignee: Dow Corning Ltd., Barry, Wales

[21] Appl. No.: 161,329

[22] Filed: Feb. 18, 1988

Related U.S. Application Data

[63] Continuation of Ser. No. 884,838, Jul. 11, 1986, abandoned.

[30] Foreign Application Priority Data

Jul. 25, 1985 [GB] United Kingdom ................ 8518871

[51] Int. Cl.[4] ...................... B01D 19/04; C11D 3/37; C11D 9/36; C11D 17/06

[52] U.S. Cl. ............................ 252/174.15; 252/89.1; 252/135; 252/140; 252/174.13; 252/174.25; 252/321; 252/358; 427/213; 427/220

[58] Field of Search ................ 252/89.1, 174.15, 321, 252/358, 174.13, 174.25, 140; 427/213, 220

[56] References Cited

U.S. PATENT DOCUMENTS

| | | | |
|---|---|---|---|
| 3,519,570 | 7/1970 | McCarty | 252/135 |
| 4,092,266 | 5/1978 | Abel | 252/321 |
| 4,192,761 | 3/1980 | Peltre | 252/99 |
| 4,303,549 | 12/1981 | Boylan | 252/321 |
| 4,477,370 | 10/1984 | Kavchok | 252/321 |
| 4,626,377 | 12/1986 | Kavchok | 252/321 |

FOREIGN PATENT DOCUMENTS

| | | |
|---|---|---|
| 142910A | 5/1985 | European Pat. Off. . |
| 1407997 | 10/1975 | United Kingdom . |
| 1523957 | 9/1978 | United Kingdom . |

*Primary Examiner*—Dennis Albrecht
*Attorney, Agent, or Firm*—Alexander Weitz

[57] ABSTRACT

Foam control agents for inclusion in detergent compositions in powder form, are particulate and comprise a silicone antifoam compound and an organic material which is a fatty acid or a fatty alcohol, having 12 to 20 carbon atoms, or a mixture thereof and which has a melting point in the range 45° to 80° C. and is insoluble in water. The foam control agents are made by a process in which the antifoam and the organic material are contacted in their liquid phase. These foam control agents give a good storage stability in the detergent powders.

20 Claims, No Drawings

DETERGENT FOAM CONTROL AGENTS CONTAINING A SILICONE ANTIFOAM AND A FATTY ALCOHOL

This is a continuation of co-pending application Ser. No. 884,838 filed on 7/11/86, now abandoned.

This invention is concerned with foam control agents and with detergent compositions comprising these foam control agents.

Detergent compositions in powder form are used for washing purposes in machines for washing dishes or for laundering of textiles. These compositions generally contain organic surfactants, builders, for example phosphates, bleaching agents and various organic and inorganic additives. The surfactants usually employed in domestic textile washing powders when agitated in an aqueous medium during a washing cycle tend to yield copious quantities of foam. However, presence of excessive amounts of foam during a washing cycle in certain washing machines tends to adversely affect the quality of the wash.

It has become a practice to include in detergent compositions materials which are intended to control the amount of foam produced during a washing cycle. Various materials have been proposed for this purpose, including for example certain silicone antifoams. Silicone antifoams, especially those based on polydimethylsiloxanes, have been found to be particularly useful foam controlling agents in various media. However, generally silicone antifoams, when incorporated in detergent compositions in powder form, appear to lose their effectiveness after prolonged storage in the detergent compositions.

G.B. Patent Specification No. 1 407 997 is directed to detergent compositions which contain as an essential ingredient a silicone suds controlling agent which is stable on storage. It discloses detergent compositions including a suds controlling component comprising a silicone suds controlling agent and silica or a solid adsorbent releasably enclosed in an organic material which is a water soluble or water dispersible, substantially non-surface active, detergent-impermeable carrier material e.g. gelatin, agar or certain reaction products of tallow alcohol and ethylene oxide. Specification No. 1 407 997 states that the carrier material contains within its interior substantially all of the silicone sudscontrolling agent and effectively isolates it from, i.e. keeps it out of contact with, the detergent component of the compositions. The carrier material is selected such that, upon admixture with water, the carrier matrix dissolves or disperses to release the silicone material incorporated therein to perform its suds-controlling function.

Whilst these materials are satisfactory in many respects it is desirable to enhance the range of materials which may be used to provide storage stable antifoam containing detergent compositions in powder form.

G.B. Patent Specification No. 1 523 957, which relates to detergent compositions containing a silicone foam controlling agent, discloses a powdered or granular detergent composition containing from 0.5 to 20% by weight of a foam control substance which comprises powdered or granular sodium tripolyphosphate, sodium sulphate or sodium perborate having on the surface thereof an organopolysiloxane antifoam agent, which is at least partially enclosed within organic material which is a mixture of a water insoluble wax having a melting point in the range from above 55° C. to below 100° C. and a water-insoluble emulsifying agent. G.B. Specification No. 1 523 957 states that in general it is preferred that the total amount of wax and emulsifying agent be at least equal to the amount of organopolysiloxane antifoam agent. We have found that the storage stability of the exemplified detergent compositions disclosed in G.B. Patent Specification No. 1 523 957 though better than that of detergent compositions where the silicone foam controlling agent is replaced by an organopolysiloxane antifoam agent on its own, is not always satisfactory especially when storage occurs at 40° C. over a longer period of time. It is also desirable to reduce the number of those constituents of the foam controlling agent which contribute little or no beneficial effect to the detergent composition when used in a wash cycle.

It is an object of the present invention to provide an improved silicone based foam control agent which is suitable for use in a detergent composition in the form of a finely divided powder and is capable of retaining its foam controlling qualities during storage of the the detergent composition.

It is also an object of the present invention to provide a foam control agent for inclusion in a detergent composition in powder form, wherein the number of materials used to retain the foam controlling ability of the silicone antifoam is kept to a minimum.

We have now found that foam control agents which retain their foam controlling properties during storage in a detergent composition may comprise a silicone antifoam and certain organic materials which are insoluble in water and do not require the presence of an emulsifying agent.

The invention provides in one of its aspects, a particulate foam control agent in finely divided form for inclusion in a detergent composition in powder form, the agent comprising 1 part by weight of silicone antifoam and not less than 1 part by weight of an organic material which is selected from a fatty acid having a carbon chain containing from 12 to 20 carbon atoms, a fatty alcohol having a carbon chain from 12 to 20 carbon atoms and a mixture of two or more of these, said organic material having a melting point in the range 45° to 80° C. and being insoluble in water, the foam control agent being produced by a process in which the silicone antifoam and the organic material are contacted in their liquid phase.

A foam control agent according to the invention is in finely divided particulate form and comprises discrete elements which may be mixed with a detergent composition in powder form in quantities of about 0.1 to 25% by weight of the composition and distributed throughout the composition. At room temperature and at temperatures up to about the melting point of the organic material these discrete elements comprise the organic material and the silicone antifoam. The organic material is selected for its ability to preserve sufficient of the activity of the silicone antifoam during storage and until required to perform its antifoam function during the wash cycle. Whilst not wishing to be bound by any particular theory, we believe that the organic material acts as a binder or coating to preserve the constitution and disposition of at least a substantial proportion of the discrete elements during storage of the foam control agent in admixture with the detergent composition in powder form.

The binder effect of the organic material is unaffected by heating to temperatures lower than its melting point. However, the organic material when heated to a temperature equal to or higher than its melting point becomes liquid and no longer demonstrates the binder effect, thus permitting the previously bound silicone antifoam to be released to perform its antifoam function. The organic material has a melting point in the range 45° to 80° C. The organic material may comprise a single compound which has a melting point in this range, or a mixture of compounds which has a melting point in this range. Organic materials having a melting point of 45° C. or more are chosen in order that the foam control agent may be stable under routine conditions of storage and transportation of a detergent composition containing it. During summer months, or in warmer countries, during transport or storage the ambient temperature can easily rise to 40° C. or more. Also, many housewives store the container of the detergent composition in a room where heat is often generated and temperatures could be in excess of 40° C. Organic materials having a melting point of 80° C. or less are selected in order to ensure that the silicone antifoam which is bound by the organic material is released at a useful stage in the washing cycle in order to control foaming. Foam control agents according to the invention for use in detergent compositions in powder form intended for use in laundering operations at lower temperatures, for example 60° C., preferably employ organic materials having a melting point in the range 50 to 60° C. It is advantageous to provide foam control agents in which not all the silicone antifoam is fully bound, as this appears beneficial to the control of foaming of the detergent composition in the early stage of the wash cycle i.e. before the wash liquor has reached a temperature sufficient to disrupt the binding effect of the organic material as referred to above. In this way the antifoam may perform its function of controlling the foam level at temperatures below the melting point of the organic material. This is desirable because excessive foam, even though only present during a part of the wash cycle, will decrease the laundering efficiency of the surfactants, due to for example reduced agitation.

Organic materials suitable for use in a foam control agent according to the invention are water insoluble fatty acids, fatty alcohols and mixtures thereof. Examples include stearic acid, palmitic acid, myristic acid, arichidic acid, stearyl alcohol, palmityl alcohol and lauryl alcohol. Preferably a foam control agent according to the invention comprises an organic material which is stearic acid or stearyl alcohol. These materials are preferred because of their good performance, easy availability and suitable melting point. The melting points of stearic acid and stearyl alcohol are 71.5° and 59.4° C. respectively at which temperatures they are insoluble in water. These materials do not appear to interfere with the effectiveness of the silicone antifoam when it is released into the washing liquor.

The amount of organic material employed in a foam control agent according to the invention is not less than 1 part organic material per part of silicone antifoam in order to minimise difficulties of manufacture of the foam control agent. The amount of organic material employed is chosen so that when the foam control agent has been added to a detergent composition it remains stable upon storage. It is, however, desirable to keep the amount of organic material to a minimum because it is not expected directly to contribute significantly to the cleaning performance of the detergent composition. The organic material is preferably removed from the laundered materials, for example with the washing liquor, so as to avoid unacceptable soiling or greying of the laundered materials. The weight to weight ratio of organic material to silicone antifoam in a foam control agent according to the invention may suitably be less than 10:1 Foam control agents which employ ratios above 10:1 are effective, but it does not seem necessary to employ ratios in excess of 10:1. We prefer to employ the organic material and the silicone antifoam in a weight ratio in the range 5:1 to 1:1, more preferably in the range 4:1 to 2:1.

A foam control agent according to the invention comprises a silicone antifoam. By the expression silicone antifoam, where used herein, we mean an antifoam compound comprising a polydiorganosiloxane and a solid silica. The polydiorganosiloxane is suitably substantially linear and may have the average formula $$R-\left[\begin{array}{c}R\\ |\\ SiO\\ |\\ R\end{array}\right]_n-\begin{array}{c}R\\ |\\ Si\\ |\\ R\end{array}-R$$

where each R independently can be an alkyl or an aryl radical. Examples of such substituents are methyl, ethyl, propyl, isobutyl and phenyl. Preferred polydiorganosiloxanes are polydimethylsiloxanes having trimethylsilyl endblocking units and having a viscosity at 25° C. of from $5\times10^{-5}$ m²/s to 0.1 m²/s i.e. a value of n in the range 40 to 1500. These are preferred because of their ready availability and their relatively low cost. The solid silica of the silicone antifoam can be a fumed silica, a precipitated silica or a silica made by the gelformation technique. The silica particles suitably have an average particle size of from 0.1 to 50μ, preferably from 1 to 20μ and a surface area of at least 50 m²/g. These silica particles can be rendered hydrophobic by treating them with dialkylsilyl groups and/or trialkylsilyl groups either bonded directly onto the silica or by means of a silicone resin. We prefer to employ a silica the particles of which have been rendered hydrophobic with dimethyl and/or trimethyl silyl groups. Silicone antifoams employed in a foam control agent according to the invention suitably have an amount of silica in the range of 1 to 30% (more preferably 2.0 to 15%) by weight of the total weight of the silicone antifoam resulting in silicone antifoams having an average viscosity in the range of from $2\times10^{-4}$ m²/s to 1 m²/s. Preferred silicone antifoams may have a viscosity in the range of from $5\times10^{-3}$ m²/s to 0.1 m²/s. Particularly suitable are silicone antifoams with a viscosity of $2\times10^{-2}$ or $4.5\times10^{-2}$ m²/s.

Foam control agents according to the invention may be made by any convenient method which enables contacting the silicone antifoam and the organic material in their liquid phase. The conventional procedures for making powders are particularly convenient e.g. spray drying and fluid bed coating procedures. For example the organic material in liquid form and the silicone antifoam in liquid form may be passed into a tower and permitted to form the foam control agent. In one method the silicone antifoam and the organic material are sprayed simultaneously into a spray cooling tower. Upon spraying, small liquid droplets are formed containing the silicone antifoam and the organic material. The droplets cool down as they make their way down the tower. Thus they solidify, forming a particulate finely divided foam control agent according to the invention. The silicone antifoam and the organic material may be mixed prior to spraying, or by contacting the sprayed liquid droplets of both materials, for example by spraying the materials via separate nozzles. The finely divided foam control agent is then collected at the bottom of the tower. Solidification of the droplets may be encouraged, for example by use of a cool air counterstream, thus reducing more quickly the temperature of the droplets. Preferably the ratio of organic material to silicone antifoam using this method is kept at 3:1 or above to ensure free-flowing characteristics of the agent. This eases the distribution of the foam control agent in the detergent powder. The most preferred ratio of organic material to silicone antifoam, when using this method, is from 3:1 to 4:1. If this method is used the preferred organic material comprises stearyl alcohol.

If desired other ingredients of a detergent composition or component thereof may be passed into the tower e.g. in advance of the organic material and silicone antifoam, so that the foam control agent formed includes carrier particles formed from those ingrediets. In that case we prefer to produce the foam control agent by a fluid bed coating method by passing the organic material in liquid form and the silicone antifoam in liquid form onto a fluid bed in which are suspended solid carrier particles. The foam control agent thus formed includes carrier particles from the fluid bed. These carrier particles may comprie any suitable material but conveniently may be an ingredient or component part of a detergent composition. The carrier particles utilised in the foam control agent provide a solid basis on which the silicone antifoam and the organic material may be deposited during manufacture. The foam control agent may thus be a free flowing powder at room temperature and can therefore easily be mixed into a detergent composition in powder form. The preferred ratio of organic material to silicone antifoam when using the fluid bed coating method is between 2.5:1 and 2:1. The carrier particles also bulk up the foam control agent to facilitate the dispersibility of the foam control agent in the powder detergent. Even distribution of the agent in the detergent composition is important since it is desirable that every unit-measure of the detergent composition used by the housewife contains sufficient foam control agent to stop excessive foam formation even though the foam control agent may be employed at levels below 1% by weight of the total detergent composition. Preferably the carrier particles are of water soluble solid powder material which facilitates dispersion of the silicone antifoam in the aqueous liquor during the wash cycle. However, other materials which do not chemically bond with the silicone antifoam may also be used as carrier particles. It is most suitable to choose carrier particles which themselves play an active role in the laundering or washing process. Examples of such materials are zeolites, sodium sulphate, sodium carbonate carboxymethylcellulose and clay minerals. Such materials are useful as builders, soil suspenders, diluents, softeners etc. in the detergent composition. Preferred carrier particles for use in a foam control agent according to the invention are selected with a view to avoiding settling of the foam control agent to the bottom of a container of detergent composition. Most preferred carrier particles comprise sodium tripolyphosphate (STPP) particles. STPP is preferred because it has a low bulk density of around 0.5 g/cm$^3$, is water soluble and does not appear to interfere with the effectiveness of the silicone antifoam. A foam control agent according to the invention may comprise carrier particles in an amount of from 60 to 90% by weight based on the total weight of the foam control agent. We prefer to use 70 to 80% of carrier particles by weight of the total foam control agent.

The invention provides in another of its aspects a method of making a particulate foam control agent in finely divided form for inclusion in a detergent composition in powder form wherein 1 part by weight of silicone antifoam and not less than 1 part by weight of an organic material which is selected from a fatty acid having a carbon chain containing from 12 to 20 carbon atoms, a fatty alcohol, having a carbon chain from 12 to 20 carbon atoms and a mixture of two or more of these, said organic material having a melting point in the range 45° to 80° C. and being insoluble in water, are contacted together in their liquid phase and are caused to form a solid in admixture.

In a preferred method according to the invention the silicone antifoam and the organic material may be mixed and heated to a temperature above the melting point of the organic material. They may be heated to such temperature before, during or after the mixing stage. The temperature is chosen sufficiently high, for example 90° C., so that the transport from the mixing and/or heating vessel to a spray unit does not cause this temperature to fall below the melting point of the organic material. Any conventional mixing method may be used for the mixing of the silicone antifoam and the organic material for example paddle stirring or ribbon blending. The heated mixture may then be transferred under pressure to a spray nozzle. This can be achieved by any conventional pumping system, but preferably a peristaltic pump is used as this avoids any possible contamination of the mixture with materials from the pump. The pumping rate may vary and can be adapted to the type of spray unit used. The mixture may suitably be pumped at a rate of for example $1.4\times10^{-6}$ m$^3$/s. The spray nozzle and spraying pressure are chosen such that the liquid droplets which are formed are small enough to enable even distribution in a detergent composition. The liquid particles can then be allowed to fall and form a finely divided particulate solid in admixture, or deposit themselves in admixture onto a fluid bed of a carrier material, such as the preferred STPP. A foam control agent according to the invention is then collected when the mixture has been sprayed and solidified in small particles, or deposited onto the carrier particles.

Foam control agents according to the present invention employ a novel combination of ingredients and enable production of storage stable detergent compositions in powder form without resort to water-soluble or water-dispersible, substantially non-surface active, detergent impermeable materials and without the need to add an emulsifying agent to the water insoluble organic material.

Foam control agents according to the invention do not appear to give rise to deposits of the organic material upon textiles laundered with detergent compositions containing these foam control agents in amounts sufficient to control the foam level during laundering operations. An additional advantage of the preferred foam control agents according to the invention is that the amount of organic material introduced into a detergent composition is still acceptable, even when a relatively large amount of silicone antifoam is used in the detergent composition.

The present invention also provides a detergent composition in powder form, comprising a detergent component and a foam control agent according to the invention. A foam control agent according to the invention may be added to the detergent component in a proportion of from 0.1 to 3% by weight based on the total detergent composition weight if no carrier particles are included in the foam control agent. The preferred foam control agents, which include carrier particles, may be added in a proportion of from 0.25 to 25% by weight based on the total detergent composition weight.

Suitable detergent components comprise an active detergent, organic and inorganic builder salts and other additives and diluents. The active detergent may comprise organic detergent surfactants of the anionic, cationic, non-ionic or amphoteric type, or mixtures thereof. Suitable anionic organic detergent surfactants include alkali metal soaps of higher fatty acids, alkyl aryl sulphonates, for example sodium dodecyl benzene sulphonate, long chain (fatty) alcohol sulphates, olefine sulphates and sulphonates, sulphated monoglycerides, sulphated ethers, sulphosuccinates, alkane sulphonates, phosphate esters, alkyl isothionates, sucrose esters and fluorosurfactants. Suitable cationic organic detergent surfactants include alkyl-amine salts, quaternary ammonium salts, sulphonium salts and phosphonium salts. Suitable non-ionic organic surfactants include condensates of ethylene oxide with a long chain (fatty) alcohol or fatty acid, for example $C_{14-15}$ alcohol, condensed with 7 moles of ethylene oxide (Dobanol 45-7), condensates of ethylene oxide with an amine or an amide, condensation products of ethylene and propylene oxides, fatty acid alkylol amides and fatty amine oxides. Suitable amphoteric organic detergent surfactants include imidazoline compounds, alkylaminoacid salts and betaines. Examples of inorganic components are phosphates and polyphosphates, silicates, such as sodium silicates, carbonates, sulphates, oxygen releasing compounds, such as sodium perborate and other bleaching agents and zeolites. Examples of organic components are anti-redeposition agents, such as carboxy methyl cellulose (CMC), brighteners, chelating agents, such as ethylene diamine tetraacetic acid (EDTA) and nitrilotriacetic acid (NTA), enzymes and bacteriostats. Materials suitable for the detergent component are well known to the person skilled in the art, and are described in many text books, for example Synthetic Detergents, A. Davidsohn and B. M. Milwidsky, 6th edition, George Godwin (1978).

There now follows a description of two illustrative methods of making a foam control agent according to the invention, and eight illustrative examples of foam control agents according to the invention. All parts and percentages are expressed by weight unless otherwise stated.

I. METHOD OF MAKING FOAM CONTROL AGENTS

Method I

A foam control agent according to the invention was prepared in a first illustrative method by stirring 50 g of a silicone antifoam into molten organic material. The mixture thus formed was heated to 90° C. This hot liquid mixture was then pumped with a peristaltic pump, via a heat-traced transport line, to the spray head of a fluid bed 'Aeromatic' coating equipment. There it was sprayed at a pressure of $1.2\times10^5$ Pa through a nozzle of 1.1 mm diameter at a rate of $1.42\times10^{-6}$ m$^3$/s onto a fluid bed of 500 g of STPP (Albright and Wilson, Marchon division). The STPP was kept in the fluid bed by an air pressure at a relative setting of 8 to 10. When all the mixture was sprayed onto the STPP a particulate foam control agent according to the invention was collected.

Method II

A foam control agent according to the invention was prepared in a second illustrative mthod by stirring 50 g of a silicone antifoam into 150 g of molten organic material. This was heated to 85° C. The hot liquid mixture thus obtained was then pumped with a peristaltic pump, via a heat-traced transport line, to the spray head of a fluid bed 'Aeromatic' coating equipment. There it was sprayed at a pressure of $1.2\times10^5$ Pa through a nozzle of 1.1 mm diameter at a rate of $1.42\times10^{-6}$ m$^3$/s into the spray chamber of the equipment. Cold air at a temperature of 10° C. was fed into the bottom of the chamber and passed up counterflow to the sprayed mixture. 200 g of a particulate foam control agent according to the invention was collected.

II. FOAM CONTROL AGENTS

Illustrative example foam control agents 1 to 7 were made according to the first illustrative method. Illustrative example foam control agent 8 was made according to the second illustrative method. All illustrative example foam control agents 1 to 8 are particulate finely divided materials.

Three comparative example foam control agents were made. Comparative examples 1 and 2 consisted only of the silicone antifoam and comparative example 3 was made according to the first illustrative method.

Details of the composition (in parts) of each of the example foam control agents are given in Table I.

TABLE I

| | Illustrative Foam Control Agents | | | | | | | |
|---|---|---|---|---|---|---|---|---|
| Ingredients | 1 | 2 | 3 | 4 | 5 | 6 | 7 | 8 |
| AF A | 5 | 5 | | | | | | |
| AF B | | | 5 | 5 | 5 | 5 | 5 | 5 |
| OM 1 | | 12 | | 12 | | | | |
| OM 2 | 12 | | 12 | | 25 | | | 15 |
| OM 3 | | | | | | 12 | | |
| OM 4 | | | | | | | 12 | |

| | Comparative Foam Control Agents | | |
|---|---|---|---|
| Ingredients | 1 | 2 | 3 |
| AF A | 5 | | |
| AF B | | 5 | 5 |
| OM 5 | | | 12 |

AF A was a silicone antifoam consisting of a mixture of polydimethylsiloxanes and about 13% by weight of the antifoam of hydrophobic silica. Antifoam A has a viscosity at 25° C. of $2\times10^{-2}$ m$^2$/s.
AF B was a silicone antifoam consisting of a mixture of polydimethylsiloxanes and about 4.5% by weight of the antifoam of hydrophobic silica. Antifoam B has a viscosity at 25° C. of $4.5\times10^{-2}$ m$^2$/s.
OM 1 was stearic acid ($C_{18}$), having a melting point of 72° C. (Henkel Chemicals Limited).
OM 2 was stearyl alcohol ($C_{18}$), having a melting point of 58° C. (Henkel Chemicals Limited).
OM 3 was a mixture of 3 parts stearyl alcohol ($C_{18}$) and 1 part lauryl alcohol ($C_{12}$), the mixture having a melting point of 50° C.
OM 4 was lauric acid ($C_{12}$), having a melting point of 48° C. (Henkel Chemicals Limited).
OM 5 was a mixture of 1 part of stearyl alcohol ($C_{18}$) and lauryl alcohol ($C_{12}$), the mixture having a melting point of 41° C.

AF A was a silicone antifoam consisting of a mixture of polydimethylsiloxanes and about 13% by weight of the antifoam of hydrophobic silica. Antifoam A has a viscosity at 25° C. of $2\times10^{-2}$ m$^2$/s.

AF B was a silicone antifoam consisting of a mixture of polydimethylsiloxanes and about 4.5% by weight of the antifoam of hydrophobic silica. Antifoam B has a viscosity at 25° C. of $4.5\times10^{-2}$ m²/s.

OM 1 was stearic acid ($C_{18}$), having a melting point of 72° C. (Henkel Chemicals Limited).

OM 2 was stearyl alcohol ($C_{18}$), having a melting point of 58° C. (Henkel Chemicals Limited).

OM 3 was a mixture of 3 parts stearyl alcohol ($C_{18}$) and 1 part lauryl alcohol ($C_{12}$), the mixture having a melting point of 50° C.

OM 4 was lauric acid ($C_{12}$), having a melting point of 48° C. (Henkel Chemicals Limited).

OM 5 was a mixture of 1 part of stearyl alcohol ($C_{18}$) and lauryl alcohol ($C_{12}$), the mixture having a melting point of 41° C.

III. STORAGE STABILITY TESTING

A detergent composition was prepared by mixing 9 parts sodium dodecyl benzene sulphonate, 4 parts Dobanol 45-7 (linear primary alcohol ethoxylate $C_{14-15}$ 7EO), 40 parts sodium tripolyphosphate and 25 parts sodium perborate. This composition is regarded as a basis for a detergent powder composition which may be made up to 100 parts with other ingredients, for example diluents, builders and additives; as these ingredients do not usually tend to contribute significantly to the foam generation of the composition they are not included in the detergent test composition.

The detergent test composition was divided in lots of 78 g to which the foam control agent was then added and mixed in, in proportions sufficient to give, based on the weight of the detergent test composition, the level of silicone antifoam mentioned in Table II in order to provide sample detergents. Illustrative sample detergents 1, 2, 3, 4, 5, 6, 7 and 8 contained respectively the first, second, third, fourth, fifth, sixth, seventh and eighth illustrative example foam control agent. Also first, second and third comparative sample detergents were prepared, containing respectively the first, second and third comparative example foam control agents.

A conventional automatic washing machine (Miele 427) of the front loading type having a transparent door through which clothes may be loaded to a rotation drum of the machine was loaded with 3.5 kg of clean cotton fabric. A wash cycle with a prewash and a main wash (95° C.) was carried out using one portion of sample detergent for each of the prewash and the main wash, each portion containing 78 g of the detergent test composition. The door of the washing machine was divided in its height by a scale from 0 to 100% with 10% intervals. The level of the top of the foam during the wash cycle was compared with the scale after about 40 minutes of the main wash, when the temperature had reached 90° C., when the rotation drum of the washing machine was stationary and the scale values were recorded.

One set of illustrative sample detergents and comparative sample detergents was tested immediately after admixture of the foam control agent or of the silicone antifoam (initial test), and a second set was stored in closed glass containers at 40° C. for 30 days before testing (test after storage). The results are recorded in Table II.

TABLE II

| Detergents | % Si-Antifoam Added | FOAM HEIGHT RECORDED (%) Initial Test | Test After Storage |
|---|---|---|---|
| Comparative | 0.19 | 20% | — |
| Sample 1 | 0.26 | NIL | overflow (9 min)* |
| Illustrative | 0.19 | 30% | 60% |
| Sample 1 | 0.26 | NIL | 30% |
| | 0.32 | NIL | <10% |
| Illustrative | 0.19 | NIL | 40% |
| Sample 2 | 0.26 | NIL | 20% |
| | 0.32 | NIL | NIL |
| Comparative | 0.19 | 30% | — |
| Sample 2 | 0.26 | NIL | overflow (7 min)* |
| Illustrative | 0.19 | 30% | 70% |
| Sample 3 | 0.26 | NIL | 20% |
| | 0.32 | NIL | NIL |
| Illustrative | 0.19 | NIL | 40% |
| Sample 4 | 0.26 | NIL | 50% |
| | 0.32 | NIL | <10% |
| Illustrative | 0.19 | 50% | — |
| Sample 5 | 0.26 | <10% | 60% |
| | 0.32 | NIL | NIL |
| Comparative | 0.19 | <10% | overflow* |
| Sample 3 | 0.25 | NIL | overflow* |
| Illustrative | 0.19 | <10% | 50% |
| Sample 6 | 0.25 | NIL | 30% |
| Illustrative | 0.19 | <10% | 40% |
| Sample 7 | 0.25 | NIL | 20% |
| Illustrative | 0.26 | 15% | — |
| Sample 8 | 0.32 | — | 75% |

*By overflow we mean that the foam came out of the washing machine through a vent at the top. The time at which this occurred, measured from the beginning of the prewash, is given in brackets.

* By overflow we mean that the foam came out of the washing machine through a vent at the top. The time at which this occurred, measured from the beginning of the prewash, is given in brackets.

As can be seen from the results shown in Table II the sample detergent compositions containing a foam control agent according to the invention retain a significant proportion of their foam control ability after prolonged storage.

That which is claimed is:

1. A particulate foam contorl agent in finely divided form for inclusion in a detergent composition in powder form, the agent comprising 1 part by weight of a silicone antifoam and from 1 to 10 parts by weight of an organic material which is selected from fatty alcohols having from 12 to 20 carbon atoms, said organic material having a melting point in the rang 45° to 80° C. and being insoluble in water, the foam control agent being produced by a process in which the silicone antifoam and the organic material are contacted in their liquid phase and wherein at least one said fatty alcohol present has at least 18 carbon atoms.

2. A foam control agent according to claim 1 wherein the organic material is stearyl alcohol.

3. A foam control agent according to claim 1 wherein the organic material has a melting point in the range 50° to 60° C.

4. A foam control agent according to claim 1 wherein the agent comprises 1 to 5 parts by weight of the organic material.

5. A foam control agent according to claim 1 wherein the agent comprises 2 to 2.5 parts by weight of the organic material.

6. A foam control agent according to claim 1 wherein the agent comprises 3 to 4 parts by weight of the organic material.

7. A foam control agent according to claim 1 wherein the silicone antifoam comprises a polydimethylsiloxane having trimethylsilyl end-blocking units and a solid silica with a surface area of at least 50 $m^2/g$ which has been rendered hydrophobic with dimethyl or trimethyol silyl groups.

8. A foam control agent according to claim 1 wherein the agent also comprises carrier particles in an amount of from about 60 to 90% by weight of the total particulate foam control agent.

9. A foam control agent according to claim 8 wherein the carrier particles comprise sodium tripolyphosphate particles.

10. A detergent composition in powder form comprising a detergent component and from 0.1 to 25% by weight of the detergent composition of a foam control agent according to claim 1.

11. A method of making a particulate foam control agent in finely divided form for inclusion in a detergent composition in powder form wherein 1 part by weight of silicone antifoam and from 1 to 10 parts by weight of an organic material which is selected from fatty alcohols having a carbon chain from 12 to 20 carbon atoms,, said organic material having a melting point in the range 45° to 80° C. and being insoluble in water, are contacted together in their liquid phase and are caused to form a solid in admixture and wherein at least one said fatty alcohol present has at least 18 carbon atoms.

12. A method of making a foam control agent according to claim 11 wherein the organic material used is stearyl alcohol.

13. A method of making a foam control agent according to claim 11 wherein the organic material used has a melting point in the range 50° to 60° C.

14. A method of making a foam control agent according to claim 11 wherein 1 to 5 parts by weight of the organic material are used.

15. A method of making a foam control agent according to claim 11 wherein 3 to 4 parts by weight of the organic material are used.

16. A method of making a foam control agent according to claim 11 wherein 2 to 2.5 parts by weight of the organic material are used.

17. A method of making a foam control agent according to claim 11 wherein the silicone antifoam used comprises a polydimethylsiloxane having trimethylsilyl endblocking units and a solid silica with a surface area of at least 50 $m^2/g$ which has been rendered hydrophobic with dimethyl or trimethyl silyl groups.

18. A foam control agent when made by a method according to claim 11.

19. A method of making a foam control agent according to claim 11 wherein the silicone antifoam and the organic material are mixed together and are sprayed in the form of liquid droplets onto a fluidised bed of carrier particles in an amount of from about 60 to 90% by weight of the total particulate foam control agent onto which the liquid droplets solidify.

20. A foam control agent when made by a method according to claim 19.

* * * * *